(12) United States Patent
Dong et al.

(10) Patent No.: US 8,620,675 B2
(45) Date of Patent: Dec. 31, 2013

(54) METHOD AND APPARATUS FOR OPTIMAL SERVICE CHANNEL RECONFIGURATION BASED ON MULTI-AGENT SIMULATION

(75) Inventors: Jin Dong, Beijing (CN); Ta-Hsin Li, Yorktown Heights, NY (US); Jin Yan Shao, Beijing (CN); Li Xia, Jeddah (SA); Ming Xie, Beijing (CN); Wen Jun Yin, Beijing (CN); Bin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 12/696,763

(22) Filed: Jan. 29, 2010

(65) Prior Publication Data

US 2011/0188404 A1    Aug. 4, 2011

(51) Int. Cl.
  *G06Q 10/00* (2012.01)
  *G06F 9/45* (2006.01)
(52) U.S. Cl.
  USPC .................... 705/1.1; 705/7.11; 717/151
(58) Field of Classification Search
  USPC .................. 705/1.1, 7.11; 717/151
  See application file for complete search history.

(56) References Cited

U.S. PATENT DOCUMENTS

| | | | | |
|---|---|---|---|---|
| 7,548,879 | B2* | 6/2009 | Cash et al. | 705/35 |
| 8,065,132 | B2* | 11/2011 | Chen et al. | 703/22 |
| 2005/0228707 | A1* | 10/2005 | Hendrickson | 705/8 |
| 2008/0133320 | A1* | 6/2008 | Gluhovsky et al. | 705/10 |

\* cited by examiner

*Primary Examiner* — Jami A Plucinski
*Assistant Examiner* — Sangeeta Bahl
(74) *Attorney, Agent, or Firm* — Scully, Scott, Murphy & Presser, P.C.; Daniel P. Morris, Esq.

(57) ABSTRACT

A method, and system employing the method, for service channel reconfiguration at a service outlet includes generating service transaction data of a service outlet, generating queue management system (QMS) data of the service outlet, and generating cost and profit data for the service outlet. Data is extracted from the service transaction data and the QMS data relating to specified parameters including customer experience data, and customer demand data. The service transaction data and the QMS data is integrated with the cost and profit data providing a unified objective function. Stochastic service processes and customer behavior data are modeled. The unified objective function is evaluated using the stochastic service processes and customer behavior data model, and the service channel function of the service outlet is reconfigured using the unified objective function.

6 Claims, 3 Drawing Sheets

METHOD AND APPARATUS FOR OPTIMAL SERVICE CHANNEL RECONFIGURATION BASED ON MULTI-AGENT SIMULATION

BACKGROUND

The present invention relates to a system and method for service channel reconfiguration at a service outlet, and more specifically, service channel reconfiguration using service transaction data, queue management system data, and cost and profit data for the service outlet.

Long queues may be encountered at many service centers. Solving the problem of long queues becomes increasingly urgent in many on-site service outlets, especially in developing countries. For example, in a bank branch or a government agency, customers may have to wait for a very long time to be served.

Thus, there is a need for shortening the length of queues at service channels within a service center. The problem of service channel optimization has not been solved satisfactorily because of a plurality of issues including, demand or preference of customers is usually obtained by general high-level surveys lacking in detail, customer satisfaction is not considered a key objective as compared to cost and profit, and the complexity of utilizing site-specific data in a data analysis to provide modeling and optimization.

It would therefore be desirable to optimally reconfigure the capability of service channels in service centers or outlets for the service providers to improve efficiency and quality of service.

BRIEF SUMMARY

In aspect of the invention, a method for service channel reconfiguration at a service outlet uses a computer having data storage, the computer includes a computer readable medium having a program embodied thereon and a processor for executing the program, the method comprises: generating service transaction data of a service outlet; generating queue management system (QMS) data of the service outlet; generating cost and profit data for the service outlet; extracting data from the service transaction data and the QMS data relating to specified parameters including customer experience data, and customer demand data; integrating the service transaction data and the QMS data with the cost and profit data providing a unified objective function; modeling stochastic service processes and customer behavior data; evaluating the unified objective function using the stochastic service processes and customer behavior data model; and reconfiguring service channel function of the service outlet using the unified objective function.

In a related aspect, the method further includes: modeling customer behavior using a discrete event simulation (DES) based multi agent simulation. In another related aspect, the method further includes: modeling service channel functions using a discrete event simulation (DES) based multi agent simulation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 1:
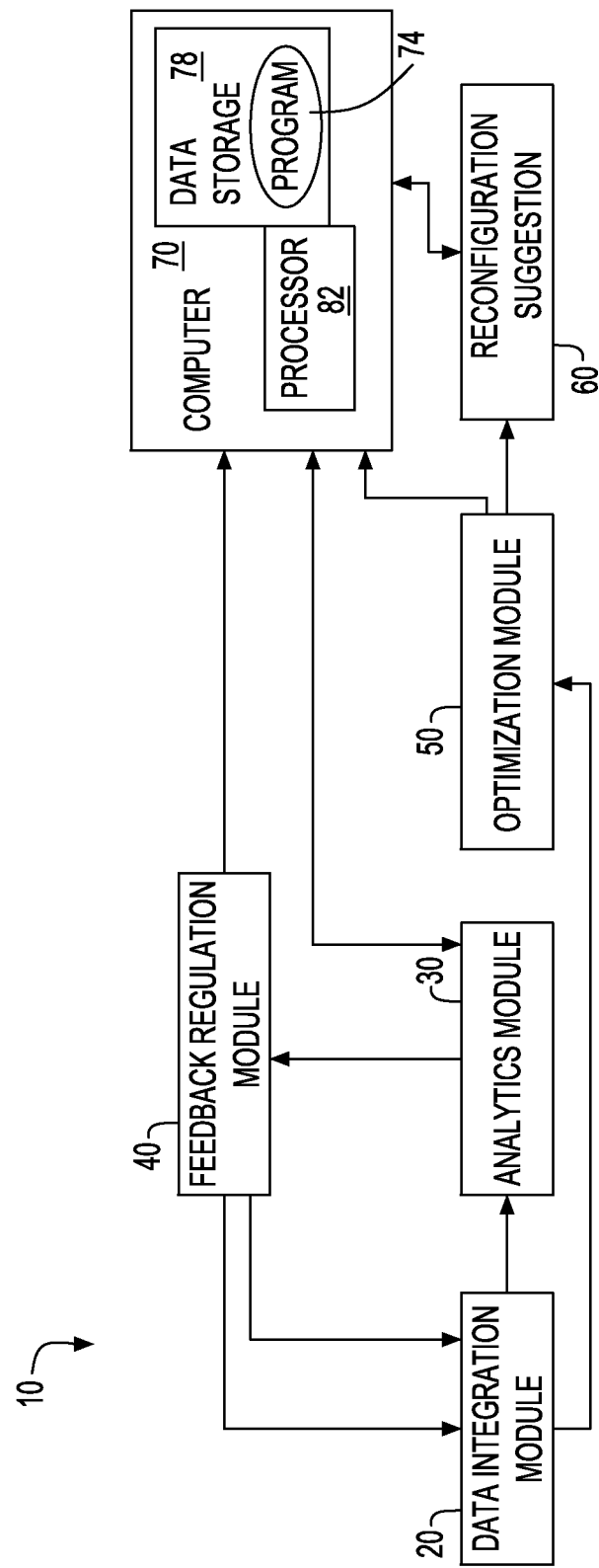
FIG. 1 is a block diagram showing the methodology of the optimal service channel configuration method according to an embodiment of the invention.

A method, and system 10 employing the method, according to an exemplary embodiment of the invention, of optimal service channel reconfiguration based on multi-agent simulation includes five modules, shown in FIG. 1. The five modules comprise: a data integration module 20, analytics module 30, feedback regulation module 40, optimization module 50, and reconfiguration suggestion module 60. The five modules are integrated and implemented on a software platform, e.g., a computer program 74 saved on computer readable medium such as a data storage device 78 communicating with a processor 82 in a computer 70. The computer program 74 provides a multi-agent simulation platform for function specific modules as described below.

The data integration module 20 accepts multiple data sources including queue management system (QMS) data, transaction data, branch layout data, service type data, service channel data, channel capability data, branch capacity data, specific customer experience data. The first five data sources are initial data, while the last three data sources are intermediate data sources which are extracted from the initial data.

Figure 2:
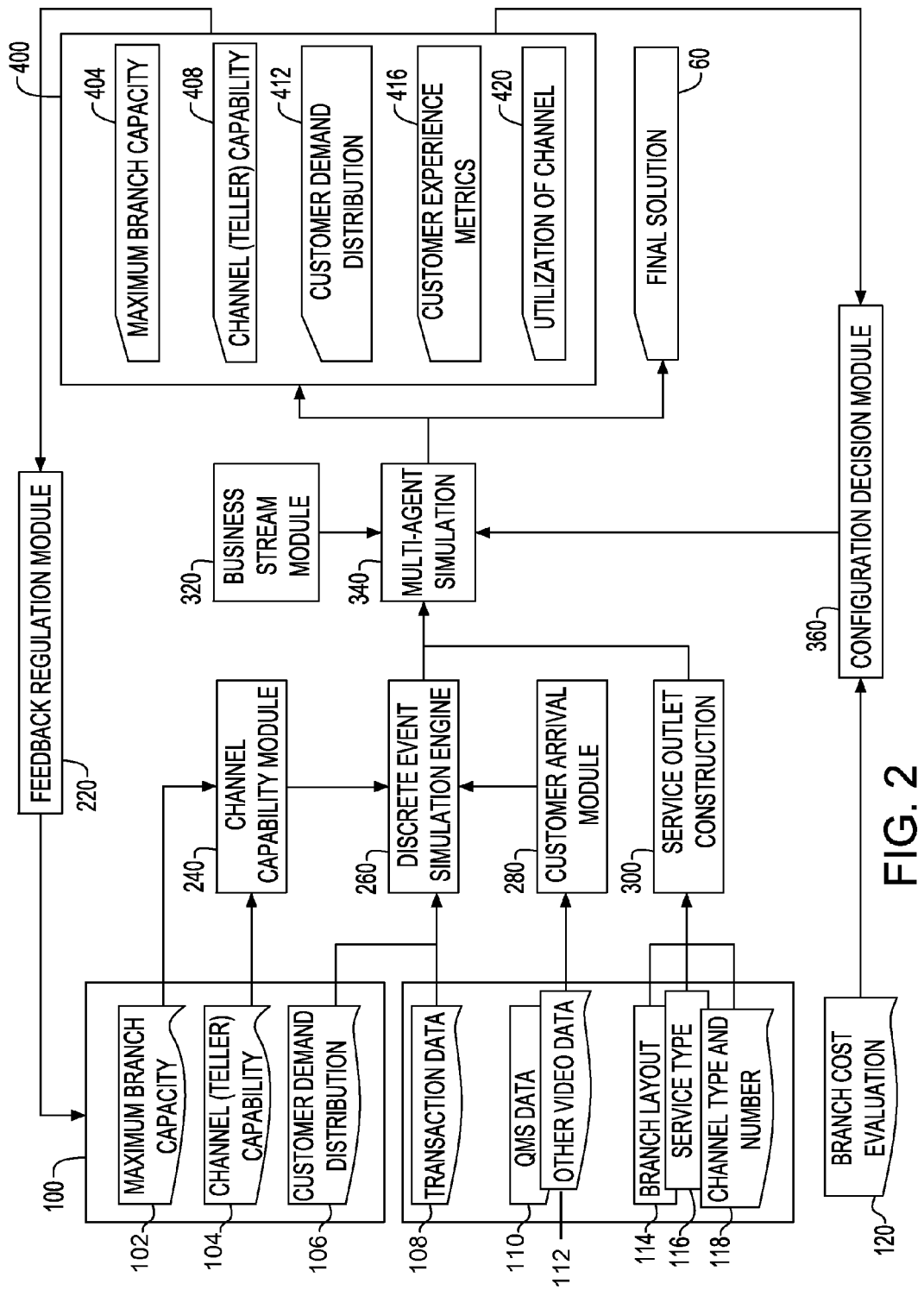
FIG. 2 is a block diagram of an embodiment of the method of the invention.

An analytics module 30 is used to distill and analyze the key metrics about customers and performance including customer demand distributions (customer arrival distribution), customer experience metrics, channel utilization, channel capability, etc. Some of these metrics will be feedback to the date integration module 20 as new inputs. A feedback regulation module 40 regulates parameters for optimization. The feedback regulation module 40 uses the extracted metrics for customer experience and branch capability as new inputs to enrich the data integration module 20 and then calibrate the parameters in a configuration decision module 360 (FIG. 2).

The optimization module 50 is activated after extracting the channel utilization and specific customer experience using the analytics module 30, the optimization module integrates the channel utilization, channel cost and customer experience to construct an objective function for optimization. The objective of the module is to minimize the function $f$ which is defined as:

$$f = \sum_{i=1}^{l}\sum_{j=1}^{m} C_{ij} - \sum_{i=1}^{l}\sum_{j=1}^{m} k_i O_{ij} + L\left(\overline{Q} + \sum_{i=1}^{n} \sigma_i \overline{T}\right)_j,$$

where:
    l represents types of channels;
    m is a number of each type of channel;
    n represents types of service;
    $k_i$ (i=1, 2, . . . , l) are positive coefficients, indicate the importance of each type of channel;
    $O_{ij}$ is utilization of channel of type i and number j;
    Q is the evaluation of queue length (e.g., average, percentile, or maximum length over certain time internal);
    $T_i$ is evaluation of waiting time of customer for i-th service;
    $\sigma_i$ is proportion of services, determined by relative importance or transaction time of each service;

L(Q,T) is evaluation of profit lost caused by customer dissatisfaction because of queuing and waiting;

Further, input data is the channel set $M=(m_1, m_2, \ldots, m_I)$ where $m_1$ is the number of i-th channel. The first item in the above equation denotes the total costs of all the channels. The second item represents the utilization of all the channels which is related directly to the branch's profits. The second item is the evaluation of profit lost caused by customer dissatisfaction because of queuing and waiting. To optimize such function can achieve balance between cost, benefit and customer experience.

Other Key Factors are defined as:

M represents channels in a service outlet embodied as a bank;

S represents services provided by the bank;

C represents the cost of a channel, including both the equipment and a teller;

Q represents the length of queuing;

T is the waiting time of a customer;

O represents occupation of the channel or utilization of the channel.

Constraints are defined as:

$Q<Q_{max}$ represents no customer quitting because of queuing;

$T_i<T_{imax}$ represents no customer quitting because of waiting;

$O_{ij}<O_{max}$ represents every channel operating within its maximum capacity;

This optimization module achieves the optimal service channel reconfiguration based on balancing between cost, benefit and customer satisfaction. This module can be solved using global optimization algorithms (for example, GA, Tabu Search). Considering the amount of channels in a given service outlet is limited, some greed search algorithms can be applied. A Greed algorithm may be used as an exemplary design technique to find the best result. A greed algorithm is an algorithm that follows a problem solving metaheuristic of a locally optimum choice at each stage of a process with the hope of finding a global optimum. Thus, the greed algorithm solves an optimal problem by a sequence of decisions and each decision is a locally optimal one (it does not look ahead).

A reconfiguration suggestion module 60 provides a display of the final configuration decision set which includes channel type, channel number, and the forecasted cost and customer experience metrics in the suggested reconfiguration. The reconfiguration suggestion module 60 also lists all the configuration candidates to do comparisons and what-if analysis.

A multi-agent simulation platform embodied as software program 74 in the computer 70 integrates and implements all the modules 40, 20, 30, 50, 60 and algorithms. The software program 74 employs a nonparametric method (simulation technique), as opposed to parametric methods. Using the customer as example, parametric methods use formulas to model the customer behaviors, while simulation will use rules to describe the customer behaviors, thus, simulation is able to accommodate elements that cannot be described easily by analytical models. For example, the customer behaviors and the services in many service outlets, e.g., retail stores or bank branches, are very complex, and there are no analytical methods to describe the complicated characteristics precisely, while multi-agent simulation techniques provide an efficient way to describe complex system behaviors by only determining individual agent behavior rules. Moreover, multi-agent simulation can provide extensive what-if analysis and visualization. In the present invention, both the customers and service channels in service outs can be modeled by agents. Thus, FIG. 1 is an overview of the system 10 including the five main components of the feedback regulation module 40, the data integration module 20, the analytics module 30, the optimization module 50, and the reconfiguration suggestion module 60. In the optimization module 50, the global optimization algorithms are employed to search different candidates, for every candidate, it is evaluated by using the cost function $f$ (described herein above), after all candidates are evaluated, the candidate which minimizes $f$ is the optimal configuration solution.

Referring to FIG. 2, the system 10 further includes five key modules: a feedback regulation module 220; a channel capacity module 240; a discrete event simulation (DES) engine 260; a customer arrival module 280; and a service outlet construction 300. Additional modules include a business stream module 320; a multi-agent simulation module 340; and the configuration decision module 360, each implemented in three phases.

Initial data 100 includes, but is not limited to, maximum branch capacity 102, channel (teller) capability 104, customer demand distribution 106, transaction data 108, QMS data 110, other video data 112, branch layout 114, service type 116, channel type and number 118 and branch cost evaluation 120, and service and channel information. Transaction data records all the history information about customers and services. For example, in a bank branch, the format of transaction data may be as follows:

TABLE I

A sample of transaction data at bank branch

| Account ID | Service Type | Amount (RMB) | Time (begin) | Time (end) |
|---|---|---|---|---|
| 40025368342 | deposit | 2,000 | 08.01.02.13.54 | 08.01.02.13.57 |
| 40023986074 | loan | 50,0000 | 08.01.02.14.01 | 08.01.02.14.25 |
| 40020974658 | transfer | 10,000 | 08.01.02.14.30 | 08.01.02.14.35 |

QMS is widely used in some service outlets, e.g., bank branches, or hospital. The QMS data may record customer basic information (name, sex, age, address, and account number), arrival time, and service type. Continuing using the bank branch example, the format of QMS data may be as follows:

TABLE II

A sample of QMS data at bank branch

| Account ID | Service Type | Arrival time | Queue length | Forecasted waiting time (m) |
|---|---|---|---|---|
| 40025128734 | deposit | 08.01.03.11.24 | 5 | 15 |
| 40023935872 | loan | 08.01.03.11.31 | 3 | 60 |
| 40029836540 | transfer | 08.01.03.11.50 | 7 | 35 |

After simulation based on the initial data, some key metrics and parameters are obtained for further optimization using the feedback regulation module 220. This extraction takes place at three phases. In phase I, the transaction data and QMS data are integrated and a series of metrics can be extracted including the current channel (teller) capacity 408, customer demand distribution 412, customer experience 416, channel utilization 420, etc. Among all the extracted metrics, the customer demand distribution and channel (teller) capacity will be feedback to the system as new inputs. In phase II, based on the transaction data, QMS data and the new inputs, the maximum branch capacity can be obtained which will be used as new input to be feedback to the system in phase III.

Example extracted data 400 from the initial data includes customer demand distribution 412 as the historic customer arrival distribution, i.e., since different customers need different services, the customer arrival distribution can also represent the service demand distribution. Channel (teller) capability 408 denotes the service level and efficiency of every channel, this metric is related to the channel type (different type denotes different capability) and the tellers, as even having the same type, for example, two channels may have different service level because of the tellers' skills. Maximum branch capacity 404 denotes the maximum service capacity of the service outlet when all the channels have the maximum capacity at current configuration. This metric is used to distinguish whether the current customer demand exceeds the maximum service capacity. Utilization of channel denotes the proportion of busy time to total time for a channel, that means if the total service time for a channel is 8 hours among which in 2 hours the channel is idle (with no customer served), the utilization of this channel may be ¾. The utilization of channels is related directly to the profit of the service outlet.

Customer experience metrics 416 include the customer's waiting tolerance, and the maximum queue length the customer can accept. In the present invention, compared with some conventional methods who use a general (city wide) waiting tolerance or queue length, the present invention uses a more detailed customer satisfaction metrics from transaction data and QMS data for different types of service at the given outlet channel capacity module 240. Channel capacity module 240 is responsible to integrate the two metrics (channel (teller) capacity and maximum branch capacity) into the simulation engine or program 74. These two metrics are modeled as optional constraints of channels as the customer demands increase.

The discrete event simulation engine 260 is used to model customer behavior, model branch operation, and model channels. Compared with the conventional sequent simulation, this technique greatly improves efficiency for simulation of scenarios with long time span, multiple server and large number of customers.

The customer arrival module 280 extracts the arrival time from the QMS data and the service time from the transaction time to determine the generation of a customer agent and the agent's behavior. Compared with some conventional methods which use simple distributions (e.g., assuming the customer arrival distribution is a Poisson distribution), the customer arrival module 280 simulates more accurate customer arrival.

The service outlet construction 300 uses the basic information (branch layout, channel type & number) of service outlet to build the simulation environment. Employing visualization techniques may be employed so that the simulation scenarios depict realistic service outlets.

The business stream module 320 is used to assign the customer with different service demands to every channel, since different channel have different capability and can provide different service. The allocation principle is determined by a manager of a given service outlet.

Figure 3:
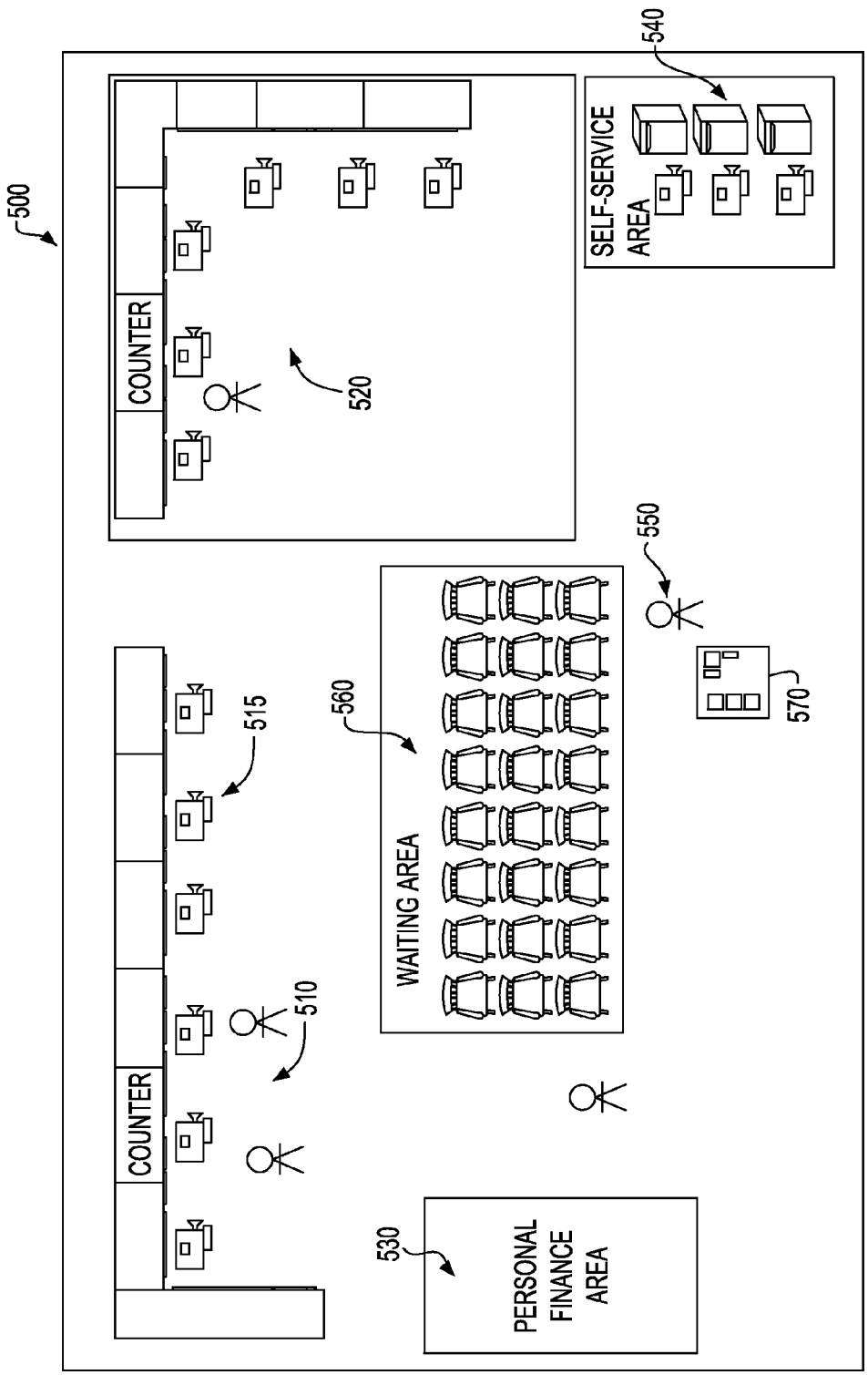
FIG. 3 is a block diagram of an embodiment of the invention showing a service channel reconfiguration.

Referring to FIG. 3, an example of optimal service channel reconfiguration 500 based on multi-agent simulation at a bank branch including video cameras 515 and including four kinds of channels, counter area 510, counter area 520, personal finance area 530, and self service area 540. Multi-agent simulation 340 (FIG. 2) generates a simulation scenario 500 (FIG. 3) of reconfiguration of service channels at bank branch. In the bank branch, four kinds of channels (510, 520, 530, 540) can provide the financial services. In the waiting area 560, thirty two seats are settled for the customers in queuing. Near the entrance, there is a QMS machine 570 which records the arrival of every customer, the services they need and the status of queuing. Using multi-agent modeling 10, no system level behaviors need to be defined. The system 10 describes only agent properties and interactions to approximate the complex customer behavior and the complicated characteristics of services at any level of details.

In an exemplary example of a customer behavior model (FIG. 3) as a simulation at a bank branch 500, firstly, a customer 550 arrives in the bank branch. The customer may find the hall is crowded (e.g., all the seats in the waiting area are occupied) and leaves, otherwise the customer goes to the QMS machine 570 to register. After registration, the customer finds how many customers (those need the same service) are queued before him/her. If the queue is longer than the customers expectations or the waiting time will exceed the customers tolerance, the customer will leave without being served while their arrival time and service demand will be recorded by the QMS 570. If the queue is not very long, the customer looks if the service channels are available, if no channel available, the customer goes to the waiting area to sit and wait for their queue number to be called, otherwise they will go to the front of the service channel and the service begins.

In another example, a service model at one channel includes the service starting and the status of a channel being changed to occupied status, and the customer's status will be changed to being served status. The service process includes the service time and service type for recording into the transaction data. After the service finishes, the status of the channel will switch to available status and is prepared to serve the next customer. If the queue is empty, that means all the customers who need this service have been served, the channel will then switch to idle status. If there are still customers waiting to be served, the next customer in the queue will be served next, and the service will run again until all the waiting customers are helped. The configuration decision module 360 (FIG. 2) accepts the extracted customer experience, and combines the utilization and cost of channels to construct the optimization objective function as described regarding optimization module 50 (FIG. 1). The optimization objective function is coupled with the transaction data and candidate configuration solution to produce the optimal configuration suggestion 60.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for service channel reconfiguration at a service outlet using a computer having data storage, the computer including a non-transitory computer readable medium having a program embodied thereon and a processor for executing the program, the method comprising:

generating service transaction data of a service outlet by the computer including the non-transitory computer readable medium and having the program embodied thereon and the processor for executing the program;

generating queue management system (QMS) data of the service outlet using the computer;

generating cost and profit data for the service outlet using the computer;

extracting data from the service transaction data and the QMS data relating to specified parameters including customer experience data, and customer demand data using a feedback module of the computer;

integrating the service transaction data and the QMS data with the cost and profit data using an optimization module to provide an objective function using the computer;

activating the optimization module after extracting a channel utilization and a specific customer experience using an analytics module;

modeling stochastic service processes and customer behavior data using the computer;

evaluating the objective function using the stochastic service processes and customer behavior data model using the computer;

reconfiguring a service channel function of the service outlet using the objective function including using a reconfiguration suggestion module of the computer to provide an optimization objective function using the objective function; and displaying a final configuration decision set which includes: a channel type, a channel number, and a forecast cost and customer experience metrics using the reconfiguration suggestion module, wherein said objective function is calculated using the following equation for optimization:

$$f = \sum_{i=1}^{l} \sum_{j=1}^{m} c_{ij} - \sum_{i=1}^{l} \sum_{j=1}^{m} k_i O_{ij} + L\left(Q + \sum_{j=1}^{m} \sigma_i T\right)i$$

wherein l represents types of channels; m is a number of each of the types of channels; n represents types of service; $k_i$=1, 2, . . . , l) are positive coefficients and indicate importance of each of the types of channels; $O_{ij}$ is a utilization of channels of type i and number j; Q is a queue length over a certain time interval; $T_i$ is a wait time of a customer for i-th service; $\sigma_i$ is a proportion of services determined by a relative importance or a transaction time of each of a plurality of services; and L(Q,T) is a lost profit caused by customer dissatisfaction resulting from the queue length and the certain time interval, wherein a programmed processor device performs said service transaction data generating, queue management system data generating, cost and profit data generating, said extracting data, said integrating, activating, modeling, evaluating and reconfiguring and displaying.

2. The method of claim 1, further including:
modeling customer behavior using a discrete event simulation (DES) based multi agent simulation.

3. The method of claim 1, further including:
modeling service channel functions using a discrete event simulation (DES) based multi agent simulation.

4. The method of claim 1, wherein the optimization module provides the objective function by calculating the objective function by quantifying data including: a plurality of channels, a number of each type of the plurality of channels, types of service, coefficients which indicate the importance of each type of channel, a utilization of the types of channels, a queue length, a level of importance, and a transaction time of each of a plurality of services, and a profit loss by customer dissatisfaction resulting from the queue length and the transaction time.

5. The method of claim 1, wherein the objective function is calculated using factors including: types of channels; a number of each of the types of channels; types of service; importance of each of the types of channels; utilization of each of the types of channels; a queue length over a certain time interval; a wait time of a customer; a proportion of services determined by a relative importance or a transaction time of each of a plurality of services; and a lost profit caused by customer dissatisfaction resulting from the queue length and the certain time interval.

6. A system for service channel reconfiguration at a service outlet, the system comprising:

a computer including a computer readable medium having a program embodied thereon and a processor for executing the program, the computer configured to receive service transaction data of a service outlet, generate queue management system (QMS) data of the service outlet, and generate cost and profit data for the service outlet;

a feedback module of the computer configured to extract data from the service transaction data and the QMS data relating to specified parameters including customer experience data, and customer demand data;

an optimization module of the computer configured to integrate the service transaction data and the QMS data with the cost and profit data to provide an objective function;

an analytics module for activating the optimization module after extracting a channel utilization and a specific customer experience using the analytics module;

the computer being configured to model stochastic service processes and customer behavior data, and evaluate the objective function using the stochastic service processes and customer behavior data model;

a service channel function of the service outlet being reconfigured using the objective function including using a reconfiguration suggestion module of the computer to provide an optimization objective function using the objective function;

a display for displaying a final configuration decision set which includes: a channel type, a channel number, and a forecasted cost and a customer experience metrics using the reconfiguration suggestion module, wherein said objective function is calculated using the following equation for optimization:

$$f = \sum_{i=1}^{l} \sum_{j=1}^{m} c_{ij} - \sum_{i=1}^{l} \sum_{j=1}^{m} k_i O_{ij} + L\left(Q + \sum_{j=1}^{m} \sigma_i T\right)i$$

wherein l represents types of channels; m is a number of each of the types of channels; n represents types of service; $k_i$=1, 2, . . . , l) are positive coefficients and indicate importance of each of the types of channels; $O_{ij}$ is a utilization of channels of type i and number j; Q is a queue length over a certain time interval; $T_i$ is a wait time of a customer for i-th service; $\sigma_i$ is a proportion of services determined by a relative importance or a transaction time of each of a plurality of services; and L(Q,T) is a lost profit caused by customer dissatisfaction resulting from the queue length and the certain time interval.

* * * * *